Patented July 28, 1925.

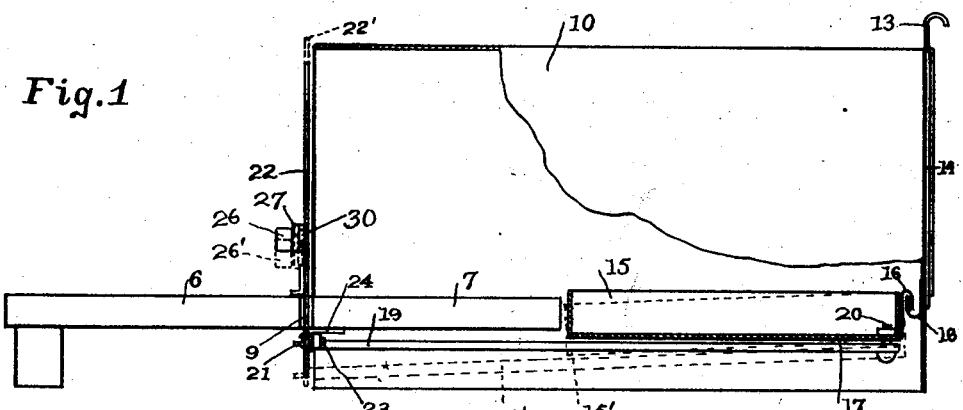
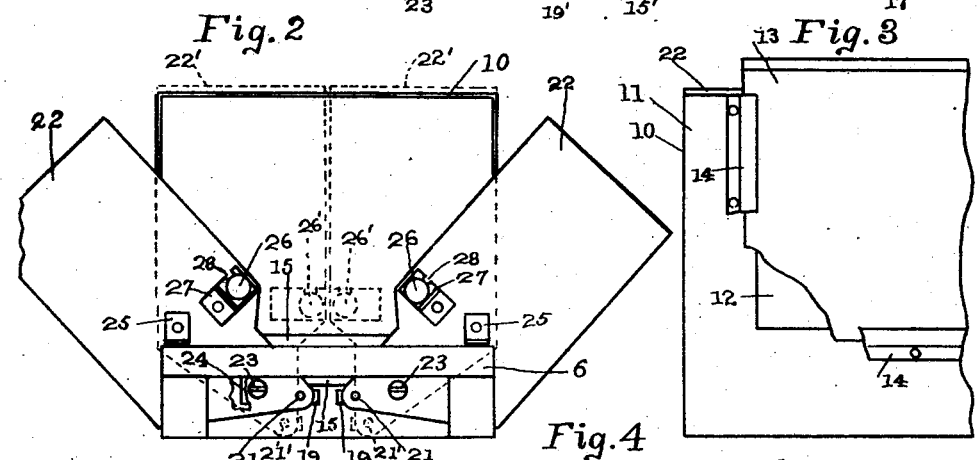
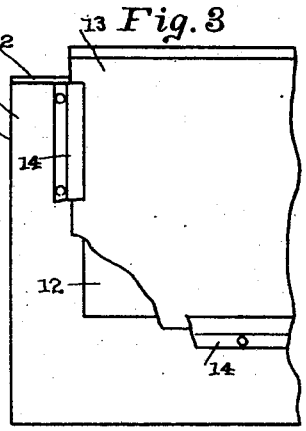
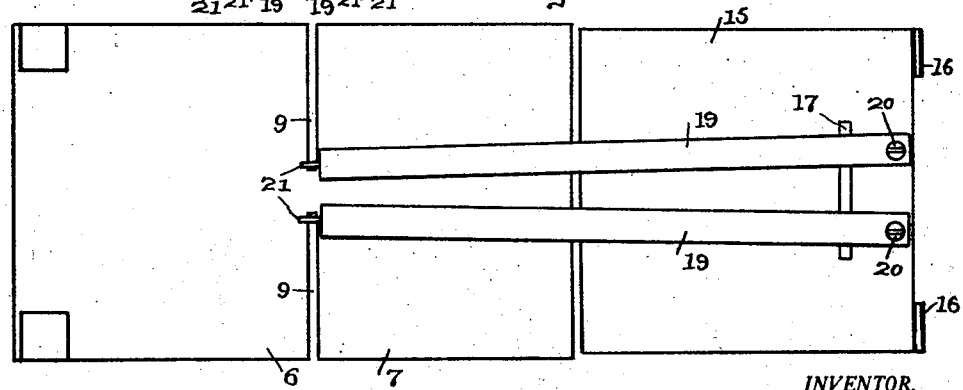
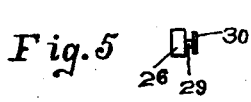

1,547,851

UNITED STATES PATENT OFFICE.

HAROLD VIDETTO, OF FERNDALE TOWNSHIP, WHATCOM COUNTY, WASHINGTON.

HEN'S NEST.

Application filed November 10, 1924. Serial No. 748,826.

*To all whom it may concern:*

Be it known that I, HAROLD VIDETTO, a citizen of the United States, and a resident of the township of Ferndale, in the county of Whatcom and State of Washington, have invented a new and useful Hen's Nest, of which the following is a specification.

My invention relates to improvements in hens' nests, and one of the objects of my improvements is to provide a trap nest the doors of which are closed by the weight of the hen on the nest. Another object of my improvements is to provide a hen's nest the doors of which can be adjusted either to open when the hen leaves the nest and allow her freedom to pass through said doors, or to remain closed once she is on the nest till opened by an operative. Another object of my improvements is to provide a trap nest having a back door through which eggs can be removed without seriously disturbing the hen. Another object of my improvements is to provide a nest which affords the hen complete privacy and protection from light. And a further object of my improvement is to provide a trap nest of simple and not expensive construction, attractive to the hen and easily cleaned and disinfected.

I attain these objects with the mechanism illustrated in the accompanying sheet of drawings in which Figure 1 is a side elevation of my hen's nest partly in vertical section, Fig. 2 is a front end elevation of Fig. 1, Fig. 3 is a rear end elevation with the doors closed, Fig. 4 is a bottom plan view of the nest tray and nest platform without the nest house and doors, and Fig. 5 is a side elevation of one of the counterweights.

Similar characters refer to similar parts throughout. Certain parts are broken away to show other parts hidden thereby.

More particularly: A wooden floor has a platform part 6 outside and an inside part 7 which constitutes the entire inside floor excepting the nest tray. These parts of the floor are nearly severed by door slideways 9, 9. A nest house 10 consists of a top, sides reaching below both floor and nest tray and a rear end 11 having a door opening 12, closable by sliding door 13 in slideways 14. By preference the house is made of galvanized sheet metal. The sides of house 10 are fastened to the edges of floor 7. Nest tray 15 has hooks 16, 16 fastened to its rear edge and a chaffing bar 17 fastened transversally to its bottom externally. Two hooks 18 are fastened to the rear end 11 of the house near its bottom adapted for engagement by tray hooks 16. When nest tray 15 is hung on said hooks its front end is free to oscillate thereon. Two suspending bars 19, preferably of wood, have their rear ends pivoted to the nest tray bottom by bolts 20, 20 and lie on or underneath chaffing bar 17. Bars 19 extend forward to door slideways 9, 9 and each has a pivot pin 21 in its front end projecting forward. Front doors 22, 22 are each pivoted on one of bolts 23, 23 which are mounted in knees 24, 24 fastened to floor 7 beneath. Stop knees 25, 25 are fastened to doors 22 to limit their outward swing by bearing on platform 6. Pivot pins 21 engage in holes in the lower inner corners of doors 22. Pivot bolts 23 are nearer the inner edges than the outer edges of doors 22 which causes the doors to overbalance outwardly and thus doors 22 normally stand open as shown in full lines in Fig. 2, except for counterbalances 26, 26. Each of these counterbalances has a weight 26, neck 29 and head 30. On the inner edges of doors 22 are fastened clips 27 each of which has a slot 28. A counterweight 26 is hung on each one of doors 22 by engaging neck 29 in slot 28 of one of clips 27. When doors 22 stand open, as shown in full lines in Fig. 2, counterweights 26 are nearly vertically over pivot bolts 23 and said weights have little effect in retaining said doors in their open position. But when doors 22 are in their closed position at 22' weights 26 are at 26' and each exercises a turning moment around one of pivots 23 to retain said doors in their closed position. Counterweights 26 are sufficiently heavy to overbalance the doors, when the same are in a vertical or closed position, to retain them in said closed position against the operation of small forces. However, when weights 26 are not in place in clips 27 said doors are overbalanced outwardly and normally assume their open position at 22.

When said doors are open pressure applied downwardly in nest tray 15 will cause the front end of said tray to move downward about hooks 16, 18 and carry pivot pins 21 downward also. This tray movement continued will bring pins 21 to their lower limit at 21' which has caused doors 22 to move to their closed position at 22'. If counterweights 26 are in place on said doors, the doors will remain closed, as explained; but if said weights have been removed, the doors 22 will return to their open position when the pressure no longer operates to depress nest tray 15. When the forward end of bars 19 move downward with pins 21 they are caused to spread apart by the downward and outward movements of said pivot pins in arcs about pivot bolts 23. This movement is provided for by pivot bolts 20 in the rear ends of bars 19. And to prevent needless friction between said bars and the tray bottom chaffing bar 17 is used to provide a slide for said bars.

My nest is constructed to require less than the weight of a hen in nest tray 15 to provide sufficient downward pressure on pins 21 to close doors 22 when they are in their full-line positions shown in Fig. 2.

In operation: Straw and a nest egg are placed in tray 15, which, when doors 22 stand open, prove attractive to a hen under oviparous urge and she passes through between said open doors on to floor 7 from which she steps on to nest tray 17. Her weight on this tray causes doors 22 to close behind her and she finds herself in a darkened enclosure, protected from other hens possessed with the urge to annoy her, and she can proceed to obtain natural relief under conditions which please her very well. Having been relieved of the egg she steps from the nest tray on to floor 7. If weights 26 are in clips 27, doors 22 remain closed and she must remain within the nest house till an operative forcibly opens said doors, picks her up and examines her tag to record her number, after the practice followed when trap-nesting laying hens. But if the nest is not being used for trap-nesting purposes, then weights 26 are not hung on doors 22 and when the hen leaves the nest tray and steps on floor 7 doors 22 immediately swing open and she is free to pass out and leave the nest available for another occupant.

In practice I have found that hens are so well pleased with the privacy, protection and seclusion afforded by this nest that they will, in the presence of empty nests of the usual kind, await an opportunity to use this nest as long as nature will permit.

Having thus disclosed my invention, what I claim as new and desire to secure by Letters Patent is,—

1. In a hen's nest in combination, a nest house, a vertically oscillatable nest tray within said house, a normally open pivoted door adapted to swing on its pivot and close the entrance to said nest tray, operative connections between said nest tray and said door, and a counterweight attachable to said door vertically with said pivot when said door is open having a lesser leverage when said door is open than when said door is closed.

2. In a hen's nest in combination, a nest house, an oscillatable nest tray within said house, normally open pivoted doors adapted to swing toward each other on their pivots and close the entrance to said house, operative connections between said nest tray and said doors, and removable counterweights on said doors vertically with said pivots when said doors are open having lesser leverages when said doors are open than when said doors are closed.

HAROLD VIDETTO.